US012412532B2

(12) United States Patent
Zhao et al.

(10) Patent No.: US 12,412,532 B2
(45) Date of Patent: Sep. 9, 2025

(54) VOLTAGE-INPUT PIXEL DRIVING CIRCUIT FOR MICRODISPLAY PANEL

(71) Applicant: BEIJING DIGITAL LIGHT CHIP TECH CO., LTD., Beijing (CN)

(72) Inventors: Bohua Zhao, Beijing (CN); Ran Huang, Beijing (CN); Lei Sun, Beijing (CN)

(73) Assignee: BEIJING DIGITAL LIGHT CHIP TECH CO., LTD., Beijing (CN)

( * ) Notice: Subject to any disclaimer, the term of this patent is extended or adjusted under 35 U.S.C. 154(b) by 0 days.

(21) Appl. No.: 18/871,819

(22) PCT Filed: Feb. 29, 2024

(86) PCT No.: PCT/CN2024/079254
§ 371 (c)(1),
(2) Date: Dec. 5, 2024

(87) PCT Pub. No.: WO2024/183607
PCT Pub. Date: Sep. 12, 2024

(65) Prior Publication Data
US 2025/0266000 A1 Aug. 21, 2025

(30) Foreign Application Priority Data
Mar. 3, 2023 (CN) ........................ 202310196354.7

(51) Int. Cl.
*G09G 3/3258* (2016.01)
*G09G 3/32* (2016.01)

(52) U.S. Cl.
CPC ............ *G09G 3/3258* (2013.01); *G09G 3/32* (2013.01); *G09G 2300/043* (2013.01); *G09G 2330/021* (2013.01)

(58) Field of Classification Search
None
See application file for complete search history.

(56) References Cited

U.S. PATENT DOCUMENTS 6,509,895 B2 * 1/2003 Yanagi .................. H04N 3/127 348/E3.015
2006/0221662 A1 * 10/2006 Park .................... G09G 3/3233 365/145

(Continued)

FOREIGN PATENT DOCUMENTS

CN 103927975 A 7/2014
CN 104134680 A 11/2014

(Continued)

*Primary Examiner* — Dorothy Harris
(74) *Attorney, Agent, or Firm* — Bayramoglu Law Offices LLC

(57) ABSTRACT

Provided is a voltage-input input pixel driving circuit for a microdisplay panel. The voltage-input pixel driving circuit includes: a first transistor, a second transistor, a driving transistor, a coupling capacitor, a light-emitting element, and a MUX signal gating unit. The first transistor includes a gate connected to a scan signal line (SCAN) of the microdisplay panel, a source connected to a data signal line (DATA) of the microdisplay panel, and a drain connected to a source of the second transistor; a gate of the second transistor is connected to an external bias voltage (VBIAS), a drain of the second transistor is connected to a gate of the driving transistor, a source of the driving transistor is connected to one end of the light-emitting element, the other end of the light-emitting element is connected to a common voltage (VCOM).

10 Claims, 6 Drawing Sheets

(56) References Cited

U.S. PATENT DOCUMENTS

| | | | | |
|---|---|---|---|---|
| 2008/0291182 | A1* | 11/2008 | Yamashita | G09G 3/3233<br>345/204 |
| 2014/0327664 | A1* | 11/2014 | Kanda | G09G 3/3233<br>345/212 |

FOREIGN PATENT DOCUMENTS

| | | | | |
|---|---|---|---|---|
| CN | 104503632 | A | | 4/2015 |
| CN | 105489167 | A | * | 4/2016 |
| CN | 106128362 | A | | 11/2016 |
| CN | 109410840 | A | | 3/2019 |
| CN | 115862531 | A | | 3/2023 |
| KR | 20060113334 | A | | 11/2006 |
| KR | 20150089476 | A | | 8/2015 |

* cited by examiner

VOLTAGE-INPUT PIXEL DRIVING CIRCUIT FOR MICRODISPLAY PANEL

CROSS-REFERENCE TO THE RELATED APPLICATIONS

This application is the national phase entry of International Application No. PCT/CN2024/079254, filed on Feb. 29, 2024, which is based upon and claims priority to Chinese Patent Application No. 202310196354.7, filed on Mar. 3, 2023, the entire contents of which are incorporated herein by reference.

TECHNICAL FIELD

The present invention relates to the field of microdisplay technology, and in particular to a voltage-input pixel driving circuit for a microdisplay panel.

BACKGROUND

In recent years, with the development of AR (Augmented Reality) and VR (Virtual Reality) technologies, their closely related microdisplay technology has also drawn extensive attention. Microdisplay technology (Microdisplay) is a branch of the technical field of display. Generally, displays with a diagonal size less than 1 inch (2.54 cm) or those small enough to require optical magnification are called microdisplays. Currently, common microdisplay technologies include the following 4 types: OLEDoS (Organic Light-Emitting Diode on Silicon), LEDoS (Light Emitting Diode on Silicon), LCoS (Liquid Crystal on Silicon), and DMD (Digital Micromirror Device). Among them, OLEDoS and LEDoS are both active light-emitting techniques, while LCoS and DMD are both passive light-emitting techniques. Since OLEDoS and LEDoS further have the advantages of low power consumption, high contrast, and fast response, they are more suitable for application in AR and VR technologies.

Different from conventional processes using amorphous silicon, microcrystalline silicon, or low-temperature polysilicon, OLEDoS and LEDoS microdisplays use monocrystalline silicon chips as substrates, meaning that they can use the existing mature integrated circuit CMOS (Complementary Metal-Oxide-Semiconductor) process. Hence, OLEDoS and LEDoS microdisplays can not only realize active matrix for display pixel addressing, but also achieve driving control circuits of various functions, such as scan chain circuits, digital-to-analog conversion circuits, and bandgap references, thereby significantly reducing the external connections, increasing reliability, and achieving weight reduction of the device.

Currently, the pixel unit circuit structure in OLED/LED displays often employs an analog driving method, which generally includes data voltage input and data current input. These two driving methods have their own advantages and disadvantages. For example, the main problem of the voltage input method is a display consistency problem caused by the deviation of the driving transistor parameters or a problem of a small output voltage range (source follower structure), whereas the current input method has a problem of slow writing speed. Therefore, the present invention proposes a new driving structure that can increase its output voltage range with respect to the existing voltage-input pixel unit circuit (source follower structure).

As shown in FIG. 1, a pixel driving circuit of a source follower structure in the prior art is composed of three transistors, a SCAN control signal line, a coupling capacitor $C_s$, and an OLED/LED light-emitting device. Its basic operation principle involves the following phases.

Data voltage writing phase: a SCAN signal is at a high level, a NMOS transistor M1 and a NMOS transistor M2 are turned on, and thus the gate voltage and source voltage of a driving MOS transistor MD are $V_{DATA}$ and 0 level, respectively, namely, the voltage across the coupling capacitor $C_s$ is $V_{DATA}$.

Light-emitting phase of display device: the SCAN signal is at a low level, and the NMOS transistor M1 and NMOS transistor M2 are turned off. Given that the gate voltage of the driving MOS transistor MD is $V_{DATA}$, the driving MOS transistor MD is turned on to charge the source of the driving MOS transistor MD. Assuming that the final voltage of the source of the driving MOS transistor MD is $V_{ANODE}$, and taking the capacitive coupling into consideration and assuming that the parasitic capacitance of the gate of the driving MOS transistor MD is $C_p$, then the gate voltage is $V_{DATA}+k\times V_{ANODE}$, where $k=C_s/(C_s+C_p)$.

The above-mentioned pixel driving circuit in the prior art has the following disadvantages. Static power consumption occurs during the input voltage data writing, and the NMOS transistor M1 and the NMOS transistor M2 are turned on, leading to a current loop of the path VDDP→MD→M2→GND. In addition, the source voltage of the driving MOS transistor MD cannot reach VDDP, because if the source voltage of the driving MOS transistor MD is VDDP, then the gate voltage must be $V_{DATA}+k\times$ VDDP at this time; since the gate SCAN of the NMOS transistor M1 in the light-emitting phase is 0, then the gate-source voltage of the NMOS transistor M1 is $V_{DATA}+k\times$VDDP at this time, which may cause an excessively high gate-source voltage, thereby causing a reliability problem of gate breakdown. Furthermore, the coupling of the source to the gate of the driving MOS transistor MD is close to 1:1, leading to an excessively low input voltage range.

SUMMARY

A technical object to be achieved by the present invention is to solve the problem of static power consumption in writing in the existing pixel driving circuit of a source follower structure and to ensure that the voltage output range is as close to VDD as possible without the problem of gate breakdown caused by an excessively high gate-source voltage.

Based on the above technical object, the present invention provides a voltage-input pixel driving circuit for a microdisplay panel, the voltage-input pixel driving circuit including: a first transistor M1, a second transistor MR, a driving transistor MD, a coupling capacitor $C_C$, a light-emitting element, and a MUX signal gating unit;

wherein the first transistor M1 includes a gate connected to a scan signal line SCAN of the microdisplay panel, a source connected to a data signal line DATA of the microdisplay panel, and a drain connected to a source of the second transistor MR; a gate of the second transistor MR is connected to an external bias voltage VBIAS, a drain of the second transistor MR is connected to a gate of the driving transistor MD, a source of the driving transistor MD is connected to one end of the light-emitting element, the other end of the light-emitting element is connected to a common voltage VCOM, and a drain of the driving transistor MD is connected to the MUX signal gating unit;

- the MUX signal gating unit outputs a low level signal when the scan signal line SCAN transmits a high level signal, and the MUX signal gating unit outputs a high level signal when the scan signal line SCAN transmits a low level signal; and
- the second transistor MR is in a normally-on state under the action of the external bias voltage VBIAS.

In one embodiment, the MUX signal gating unit includes a third transistor ME1 and a fourth transistor ME2, in which the third transistor ME1 includes a gate connected to the scan signal line SCAN of the microdisplay panel, a source connected to the drain of the driving transistor MD, and a drain connected to a first driving signal DR1; and the fourth transistor ME2 includes a gate connected to the scan signal line SCAN of the microdisplay panel, a source connected to the drain of the driving transistor MD, and a drain connected to a second driving signal DR2.

In one embodiment, the first transistor M1, the second transistor MR, the driving transistor MD, and the fourth transistor are all NMOS transistors; and the third transistor ME1 is a PMOS transistor.

In one embodiment, the external bias voltage VBIAS connected to the gate of the second transistor MR satisfies VBIAS>MAX_$V_{DATA}$+$V_{TH}$, where MAX_$V_{DATA}$ is the maximum voltage value of a signal transmitted by the data signal line of the microdisplay panel, and $V_{TH}$ is the threshold voltage of the first transistor M1.

In one embodiment, the voltage value of the first driving signal DR1 is greater than the voltage value of the second driving signal DR2, the first driving signal DR1 is set to be an external driving voltage VDDP, and the second driving signal DR2 is set to be grounded (GND).

In another aspect, the present invention provides a voltage-input pixel driving circuit for a microdisplay panel, the voltage-input pixel driving circuit including: a first transistor M1, a second transistor MR, a driving transistor MD, a coupling capacitor $C_C$, a light-emitting element, a MUX signal gating unit, and an adjustment capacitor $C_S$;

- wherein the first transistor M1 includes a gate connected to a scan signal line SCAN of the microdisplay panel, a source connected to a data signal line DATA of the microdisplay panel, and a drain connected to a source of the second transistor MR, a gate of the second transistor MR is connected to an external bias voltage VBIAS, a drain of the second transistor MR is connected to a gate of the driving transistor MD, a source of the driving transistor MD is connected to one end of the light-emitting element, the other end of the light-emitting element is connected to a common voltage VCOM, and a drain of the driving transistor MD is connected to the MUX signal gating unit; and one end of the adjustment capacitor $C_S$ is connected to the gate of the driving transistor MD, and the other end thereof is connected to a fixed level;
- the MUX signal gating unit outputs a low level signal when the scan signal line SCAN transmits a high level signal, and the MUX signal gating unit outputs a high level signal when the scan signal line SCAN transmits a low level signal; and
- the second transistor MR is in a normally-on state under the action of the external bias voltage VBIAS.

In one embodiment, the MUX signal gating unit includes a third transistor ME1 and a fourth transistor ME2, in which the third transistor ME1 includes a gate connected to the scan signal line SCAN of the microdisplay panel, a source connected to the drain of the driving transistor MD, and a drain connected to a first driving signal DR1; and the fourth transistor ME2 includes a gate connected to the scan signal line SCAN of the microdisplay panel, a source connected to the drain of the driving transistor MD, and a drain connected to a second driving signal DR2.

In one embodiment, the first transistor M1, the second transistor MR, the driving transistor MD, and the fourth transistor are all NMOS transistors; and the third transistor ME1 is a PMOS transistor.

In one embodiment, the external bias voltage VBIAS connected to the gate of the second transistor MR satisfies VBIAS>MAX_$V_{DATA}$+$V_{TH}$, where MAX_$V_{DATA}$ is the maximum voltage value of a signal transmitted by the data signal line of the microdisplay panel, and $V_{TH}$ is the threshold voltage of the first transistor M1.

In one embodiment, the capacitance value of the adjustment capacitor $C_S$ is greater than the capacitance value of the gate parasitic capacitance $C_P$ of the driving transistor MD.

In comparison with the prior art, the inventive points of the present invention described in one or more embodiments of the present invention include the following.

1. The voltage of drain of the pixel circuit driving transistor MD is adjusted from the fixed voltage connected to VDDP (power supply voltage) in the prior art to such a manner that the voltage of the drain is at a low level in the data writing phase and switched to a high level in the holding phase, thereby eliminating the static power consumption in the data writing phase.
2. A MOS transistor MR is connected in series behind a switch transistor M1. The MOS transistor MR is in a normally-on state. Setting the gate voltage of the MOS transistor MR can ensure that the MOS transistor still works in a safe range when the gate voltage of the driving transistor MD exceeds VDDP.
3. The pixel driving circuit of the present invention can expand the voltage range of the input data signal $V_{DATA}$.

The above-mentioned inventive points are throughout the technical solution of the present invention, and other features and advantages of the present invention will be described in the following description, and partly become obvious from the description or be understood by practicing the present invention. The objects and other advantages of the present invention can be achieved and obtained by the structures particularly indicated in the description, claims, and drawings.

BRIEF DESCRIPTION OF THE DRAWINGS

The accompanying drawings are used to provide a further understanding of the present invention and constitute a part of the specification. Along with the examples of the present invention, the accompanying drawings are used to explain the present invention and are not a limitation of the present invention. In the accompanying drawings.

DETAILED DESCRIPTION OF THE EMBODIMENTS

Figure 1:
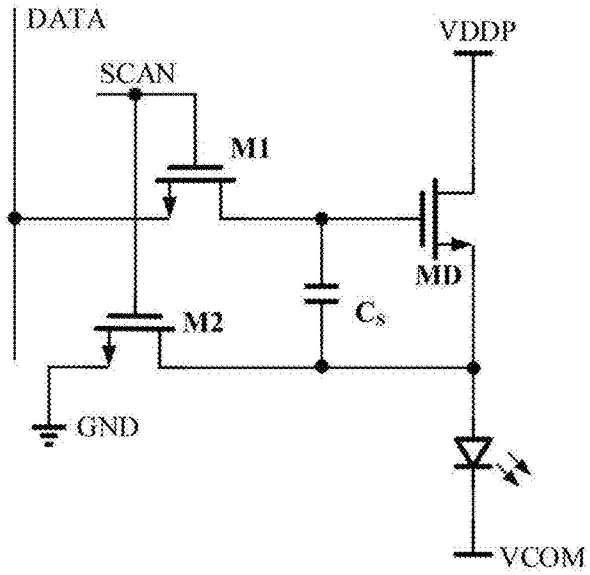
FIG. 1 (Prior Art)
FIG. 1 is a schematic diagram of the circuit structure of a pixel driving circuit of a source follower structure in the prior art.

In order to further clarify the objects, technical solutions, and advantages of the present invention, the present invention is further described in detail below with reference to the accompanying drawings.

Before the following detailed description, it may be advantageous to describe the definitions of some words and phrases used throughout the present invention. The terms "couple", "connect" and their derivatives refer to any direct or indirect communication or connection between two or more elements, regardless of whether these elements are in physical contact with each other. The terms "transmit", "receive", "communicate", and their derivatives encompass direct and indirect communication. The terms "include", "comprise", and their derivatives refer to including but being not limited to. The term "or" is inclusive and means and/or. The phrase "associated with" and its derivatives refer to including, being included in, interconnecting, comprising, being comprised in, connecting or connecting with, coupling or coupling with, communicating with, cooperating, interweaving, being in parallel, approaching, binding or binding with, having, having attributes of, having a relation or having a relation with, etc. The term "controller" refers to any device, system, or a part thereof that controls at least one operation. Such a controller can be implemented with hardware or a combination of hardware and software and/or firmware. The functions associated with any particular controller can be centralized or distributed, regardless of whether it is local or remote. The phrase "at least one", when used with a list of items, means that various combinations of one or more of the listed items may be used, and may involve only one of the items in the list. For example, "at least one of A, B, and C" includes any of the following combinations: A; B; C; A and B; A and C; B and C; and A, B, and C.

The first end and the second end of a resistor, capacitor, or inductor in the present invention are described only to distinguish the two connection ends of the device, so as to facilitate the description of the connection relationship between the device and other devices, and do not specifically indicate a certain end of the resistor, capacitor, or inductor in actual situations. Those skilled in the art should know that, when constructing an actual circuit, any end of the resistor, capacitor, or inductor in an actual device can be defined as the first end, and when the first end is defined, the other end of the device is automatically defined as the second end.

Definitions of other specific words and phrases are provided throughout the present invention. Those of ordinary skill in the art should understand that in many, if not most instances, such definitions apply to prior and future uses of such defined words and phrases.

In the present invention, the application combination of modules and the division level of sub-modules are merely used for illustration, and the application combination of modules and the division level of sub-modules may have various modes without departing from the scope of the present disclosure.

Example 1

Figure 2:
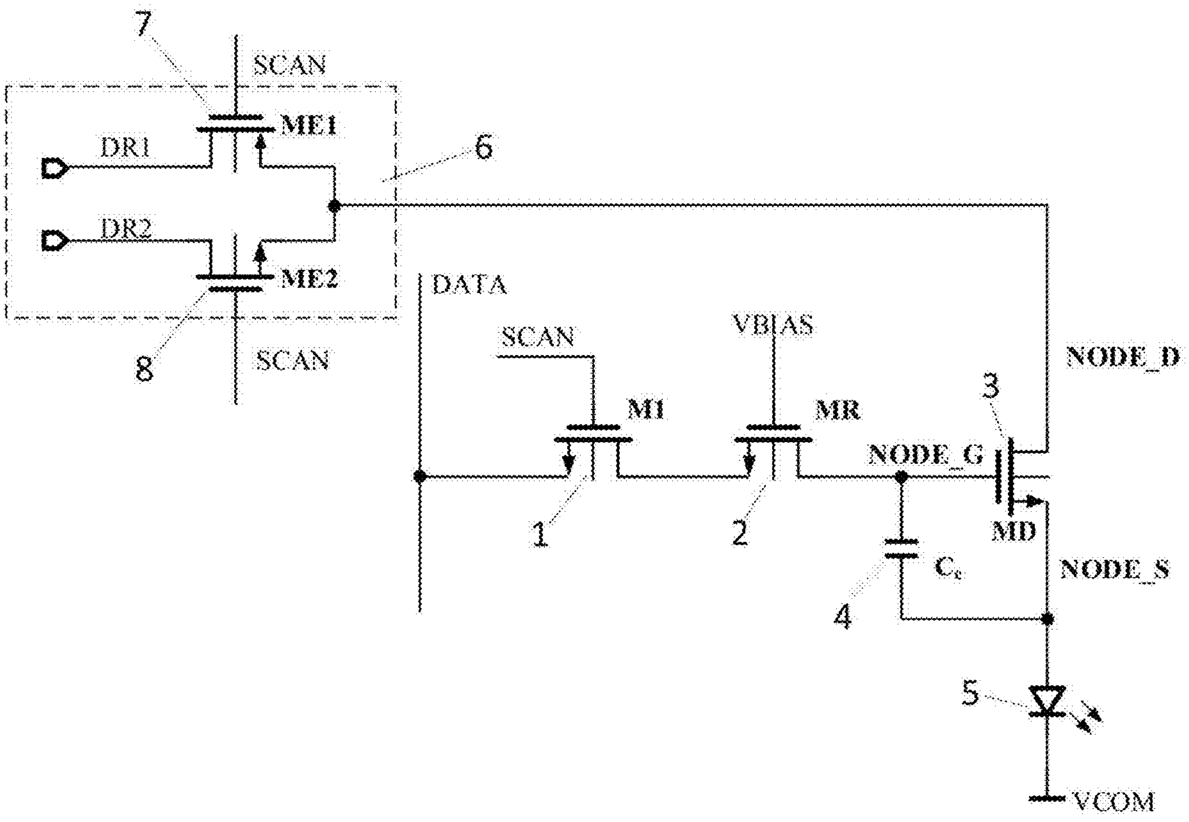
FIG. 2 is a schematic diagram of the circuit structure of a voltage-input pixel driving circuit in a first example of the present invention.

FIG. 2 shows a voltage-input pixel driving circuit for a microdisplay panel according to the present example. The voltage-input pixel driving circuit includes a first transistor M1 (1), a second transistor MR (2), a driving transistor MD (3), a coupling capacitor $C_C$ (4), a light-emitting element (5), and a MUX signal gating unit (6).

In the pixel driving circuit, the first transistor M1 (1) includes a gate connected to a scan signal line SCAN of the microdisplay panel, a source connected to a data signal line DATA of the microdisplay panel, and a drain connected to a source of the second transistor MR (2), a gate of the second transistor MR (2) is connected to an external bias voltage VBIAS, a drain of the second transistor MR (2) is connected to a gate of the driving transistor MD (3), a source of the driving transistor MD (3) is connected to one end of the light-emitting element (5), the other end of the light-emitting element (5) is connected to a common voltage VCOM, and a drain of the driving transistor MD (3) is connected to the MUX signal gating unit (6).

Figure 3:
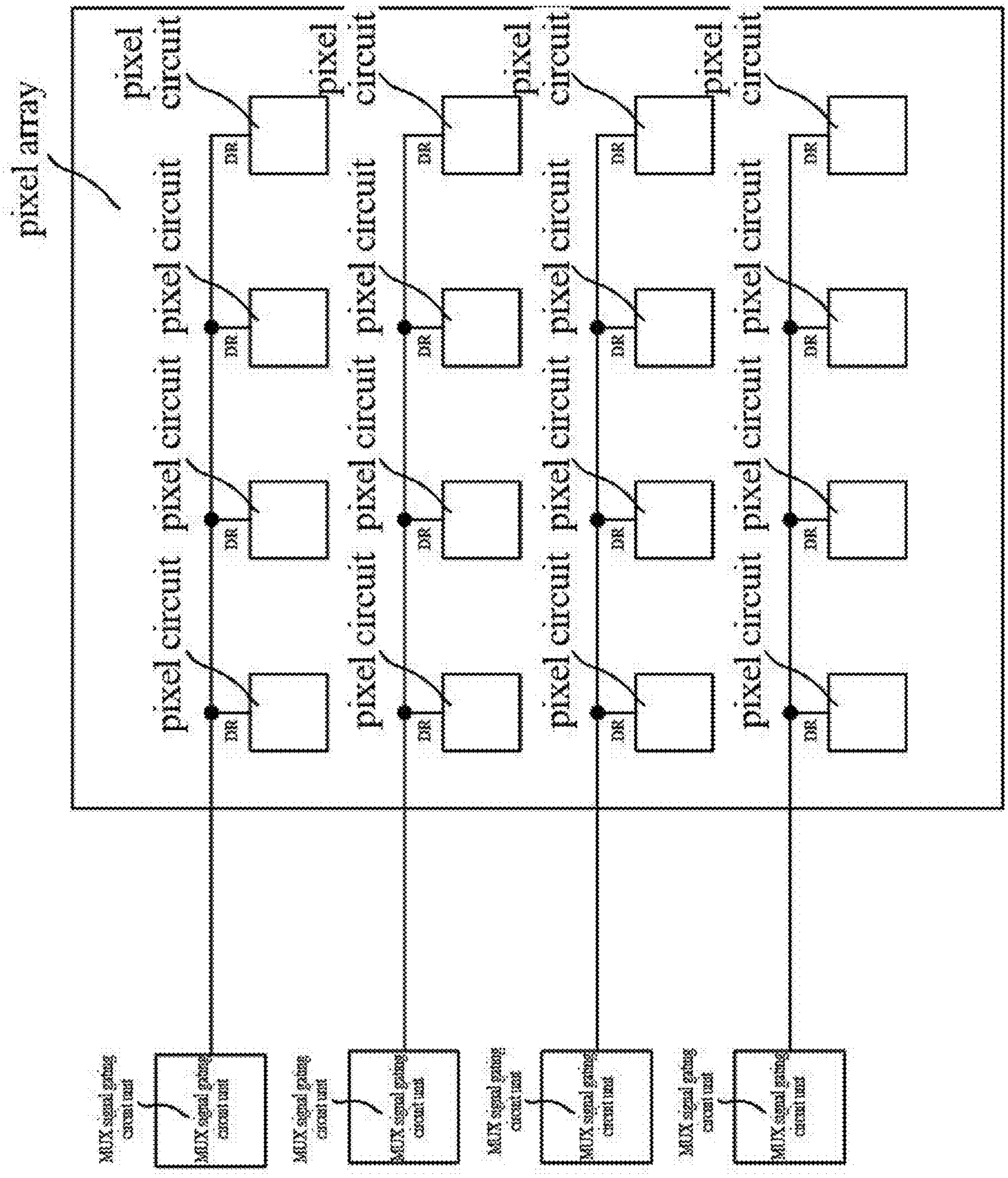
FIG. 3 is a schematic diagram of a common circuit structure of a MUX signal gating unit in the first example of the present invention.
Figure 4:
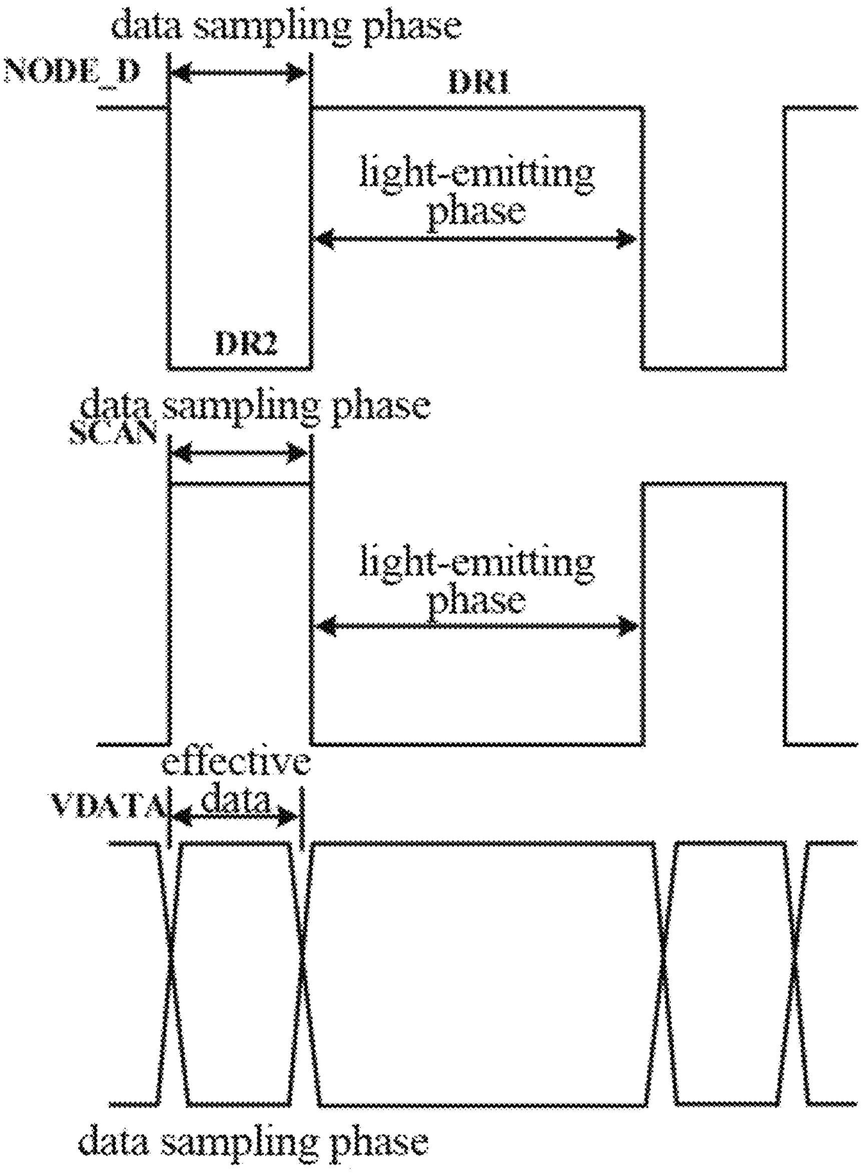
FIG. 4 is a schematic diagram of the working time sequence of the voltage-input pixel driving circuit in the first example of the present invention.

The MUX signal gating unit (6) includes a third transistor ME1 (7) and a fourth transistor ME2 (8), in which the third transistor ME1 (7) includes a gate connected to the scanning signal line of the microdisplay panel, a source connected to the drain of the driving transistor MD (3), and a drain connected to a first driving signal DR1; and the fourth transistor ME2 (8) includes a gate connected to the scanning signal line of the microdisplay panel, a source connected to the drain of the driving transistor MD (3), and a drain connected to a second driving signal DR2. As shown in FIG. 3, the MUX signal gating unit (6) in the present example is configured such that each row of pixels shares one MUX signal gating unit (6), thereby saving the area of the integrated circuit layout occupied by the MUX signal gating unit (6). Namely, the MUX signal gating unit (6) is located outside the pixel array, and each row of pixel units shares one MUX signal gating unit, and thus the area of the pixel unit circuit is not increased additionally.

In the present example, the first transistor M1 (1), the second transistor MR (2), the driving transistor MD (3), and the fourth transistor (8) are all NMOS transistors; and the third transistor ME1 (7) is a PMOS transistor.

In the present example, the external bias voltage VBIAS connected to the gate of the second transistor MR (2) satisfies VBIAS>MAX_$V_{DATA}$+$V_{TH}$, where MAX_$V_{DATA}$ is the maximum voltage value of a signal transmitted by the data signal line of the microdisplay panel, and $V_{TH}$ is the threshold voltage of the first transistor M1 (1). The threshold voltage is the turn-on voltage defined by the MOS transistor. Only when the gate-source voltage is greater than the threshold voltage, the MOS transistor has a significant current; when the gate-source voltage is less than the threshold voltage, the MOS transistor works in the subthreshold region or the turn-off region, and the current of the MOS transistor is very small at this time.

In the present example, the voltage value of the first driving signal DR1 is greater than the voltage value of the second driving signal DR2. In the present example, the first driving signal DR1 is set to be the external driving voltage VDDP, and the second driving signal DR2 is set to be grounded (GND).

In the present example, one end of the coupling capacitor $C_C$ (4) is connected to the gate of the driving transistor MD (3), and the other end thereof is connected to the source of the driving transistor MD (3). The coupling capacitor $C_C$ (4) is a capacitor of various types such as a MIM capacitor, a MOM capacitor, or a MOS capacitor.

The working process of the voltage-input pixel driving circuit in the present example is as follows.

Data voltage writing phase: at this time, the signal of the scanning signal line SCAN is at a high level, the first transistor M1 (1) and the fourth transistor ME2 (8) are turned on, and the third transistor ME1 (7) is turned off because it is a PMOS transistor; since the external bias voltage VBIAS connected to the gate of the second transistor MR (2) satisfies $VBIAS>MAX\_V_{DATA}+V_{TH}$, the second transistor MR (2) is also turned on; at this time, the gate voltage (NODE_G) of the driving transistor MD (3) is $V_{DATA}$, and its source voltage (NODE_S) and drain voltage (NODE_D) are both grounded (GND) (the second driving signal DR2 is GND at this time), and thus static writing power consumption is not caused at this time;

Light-emitting phase of display device: at this time, the signal of the scanning signal line SCAN is at a low level, the first transistor M1 (1) is turned off, the fourth transistor ME2 (8) is turned off, and the third transistor ME1 (7) is turned on; in this situation, the drain (NODE_D) of the driving transistor MD (3) is equivalent to being short-circuited with the first driving signal DR1 (the first driving signal DR1 is connected to the external driving voltage VDDP); at the initial stage, the gate voltage of the driving transistor MD (3) is $V_{DATA}$, the source voltage of the driving transistor MD (3) is GND, and thus the driving transistor MD (3) is turned on and the source of the driving transistor MD (3) is charged;

Assuming that the final source voltage of the driving transistor MD (3) is $V_{ANODE}$, and taking the capacitive coupling into consideration and assuming that the parasitic capacitance of the gate of the driving transistor MD (3) is $C_p$, the gate voltage is $V_{DATA}+k\times V_{ANODE}$ (where $k=C_C/(C_C+C_p)$, $k<1$); at this time, if $V_{ANODE}\approx VDDP$, then the gate voltage of the driving transistor MD (3) is $k\times VDDP+V_{DATA}$. Since the gate voltage of the second transistor MR (2) is $VBIAS>MAX\_V_{DATA}+V_{TH}$, the voltage difference between the gate of the second transistor MR (2) and the gate of the driving transistor MD (3) is less than $k\times VDDP-V_{TH}$, namely, the voltage difference therebetween does not exceed VDDP.

The pixel driving scheme in the present example can improve the display consistency problem caused by the variation of the threshold voltage $V_{th}$ of the driving transistor MD (3). Assuming that the threshold voltage $V_{th}$ of the driving transistor MD (3) increases due to its process, the current $I_{MD}$ of the driving transistor MD (3) would decrease, so that $V_{ANODE}$ would decrease. Since the voltage difference of the gate of the driving transistor MD (3) is $V_{GS}(MD)=V_{DATA}-(1-)\times V_{ANODE}$, $V_{GS}(MD)$ increases to offset current reduction caused by the increase of the threshold voltage $V_{th}$; conversely, assuming that the threshold voltage $V_{th}$ of the driving transistor MD (3) decreases due to its process, $V_{GS}(MD)$ decreases to offset current increase caused by the decrease of $V_{th}$.

In addition, since the second transistor MR (2) isolates the first transistor M1 (1) and the gate of the driving transistor MD (3), the leakage between the first transistor M1 (1) and the driving transistor MD (3) is prevented, and the coupling effect on the gate of the driving transistor MD (3) when the signal of the scanning signal line SCAN of the display panel jumps from a high level to a low level.

Example 2

Figure 5:
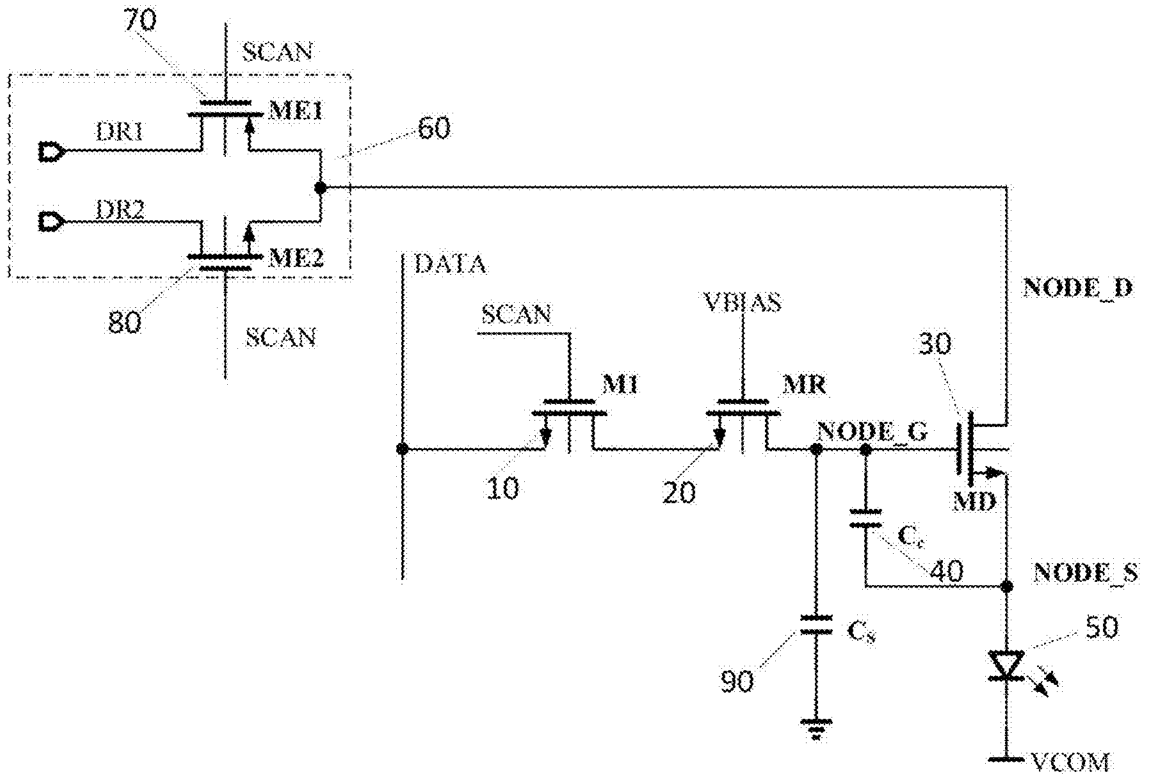
FIG. 5 is a schematic diagram of the circuit structure of a voltage-input pixel driving circuit in a second example of the present invention.

FIG. 5 shows a voltage-input pixel driving circuit for a microdisplay panel according to the present example. The voltage-input pixel driving circuit includes a first transistor M1 (10), a second transistor MR (20), a driving transistor MD (30), a coupling capacitor $C_C$ (40), a light-emitting element (50), a MUX signal gating unit (60), and an adjustment capacitor $C_S$ (90).

In the pixel driving circuit, the first transistor M1 (10) includes a gate connected to a scan signal line SCAN of the microdisplay panel, a source connected to a data signal line DATA of the microdisplay panel, and a drain connected to a source of the second transistor MR (20), a gate of the second transistor MR (20) is connected to an external bias voltage VBIAS, a drain of the second transistor MR (20) is connected to a gate of the driving transistor MD (30), a source of the driving transistor MD (30) is connected to one end of the light-emitting element (50), the other end of the light-emitting element (50) is connected to a common voltage VCOM, and a drain of the driving transistor MD (30) is connected to the MUX signal gating unit (60).

The MUX signal gating unit (60) includes a third transistor ME1 (70) and a fourth transistor ME2 (80), in which the third transistor ME1 (70) includes a gate connected to the scanning signal line of the microdisplay panel, a source connected to the drain of the driving transistor MD (30), and a drain connected to a first driving signal DR1; and the fourth transistor ME2 (80) includes a gate connected to the scanning signal line of the microdisplay panel, a source connected to the drain of the driving transistor MD (30), and a drain connected to a second driving signal DR2. Namely, the MUX signal gating unit (60) is located outside the pixel array, and each row of pixel units shares one MUX signal gating unit, and thus the area of the pixel unit circuit is not increased additionally.

In the present example, the first transistor M1 (10), the second transistor MR (20), the driving transistor MD (30), and the fourth transistor (80) are all NMOS transistors; and the third transistor ME1 (70) is a PMOS transistor.

In the present example, the external bias voltage VBIAS connected to the gate of the second transistor MR (20) satisfies $VBIAS>MAX\_V_{DATA}+V_{TH}$, where $MAX\_V_{DATA}$ is the maximum voltage value of a signal transmitted by the data signal line of the microdisplay panel, and $V_{TH}$ is the threshold voltage of the first transistor M1 (10).

In the present example, the voltage value of the first driving signal DR1 is greater than the voltage value of the second driving signal DR2. In the present example, the first driving signal DR1 is set to be the external driving voltage VDDP, and the second driving signal DR2 is set to be grounded (GND).

In the present example, one end of the coupling capacitor $C_C$ (40) is connected to the gate of the driving transistor MD (30), and the other end thereof is connected to the source of the driving transistor MD (30). The coupling capacitor $C_C$ (40) is a capacitor of various types such as a MIM capacitor, a MOM capacitor, or a MOS capacitor.

In the present example, an adjustment capacitor $C_S$ (90) is provided at the gate of the driving transistor MD (30), one end of the adjustment capacitor $C_S$ (90) is connected to the gate of the driving transistor MD (30), and the other end thereof is connected to a fixed level. In the present example, the other end thereof is grounded.

With addition of the adjustment capacitor $C_S$ (90), the gate voltage increase amount of the driving transistor MD (30) resulting from source coupling of the driving transistor MD (30) becomes $C_C/C_C+C_S+C_p)\times V_{ANODE}$. By adjusting the capacitance ratio of the coupling capacitor $C_C$ (40) and the adjustment capacitor $C_S$ (90), the range of the gate input voltage of the driving transistor MD (30) can be adjusted.

Example 3

Figure 6:
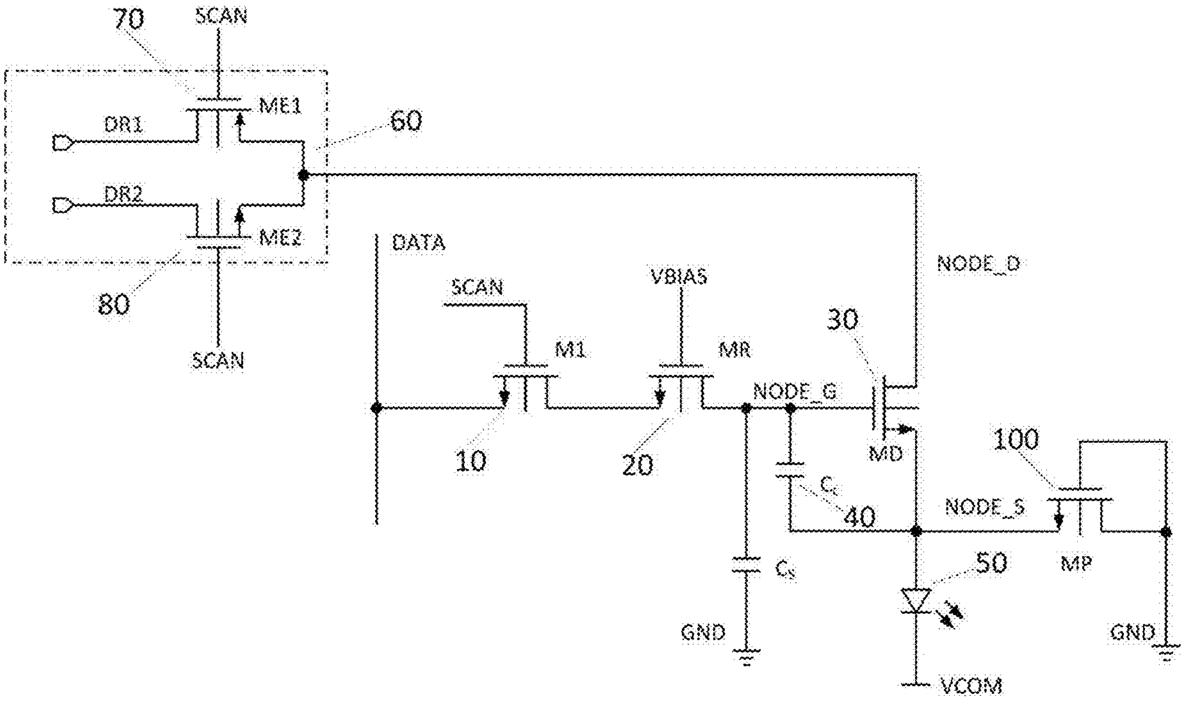
FIG. 6 is a schematic diagram of the circuit structure of a voltage-input pixel driving circuit in a third example of the present invention.

FIG. 6 shows a voltage-input pixel driving circuit for a microdisplay panel according to the present example. The voltage-input pixel driving circuit includes a first transistor M1 (10), a second transistor MR (20), a driving transistor MD (30), a coupling capacitor $C_C$ (40), a light-emitting element (50), a MUX signal gating unit (60), an adjustment capacitor $C_S$ (90), and a third transistor MP (100).

Compared with Example 2, a third transistor MP (100) is added in the present example. The source of the third transistor MP (100) is connected to the source of the driving transistor MD (30), and the gate of the third transistor MP (100) is connected to the drain of the third transistor MP (100) and grounded. The third transistor MP (100) has a function of protecting the source (NODE_S) of the driving transistor MD (30) from having an excessively low level. Namely, when the common voltage VCOM is at a negative level, the third transistor MP (100) prevents the source of the driving transistor MD (30) from having an excessively small negative level.

In addition to the embodiment provided in the example, the third transistor MP (100) can be incorporated in all other embodiments of the present invention. Since VCOM is generally a negative voltage, when the anode of the light-emitting element has a negative voltage, a large voltage difference is caused between the gate and source or the source and drain of the driving transistor MD, which affects the reliability of the driving transistor MD. With addition of the third transistor MP, if NODE_S has a relatively low negative voltage, the third transistor MP is turned on to change the level of NODE_S to close to GND, thereby avoiding a large voltage difference at any two ends of the transistor MD. In the process of normal light emission of the diode, since NODE_S is generally a positive voltage, the transistor MP is in the off state, and its normal operation is not affected.

Example 4

Figure 7:
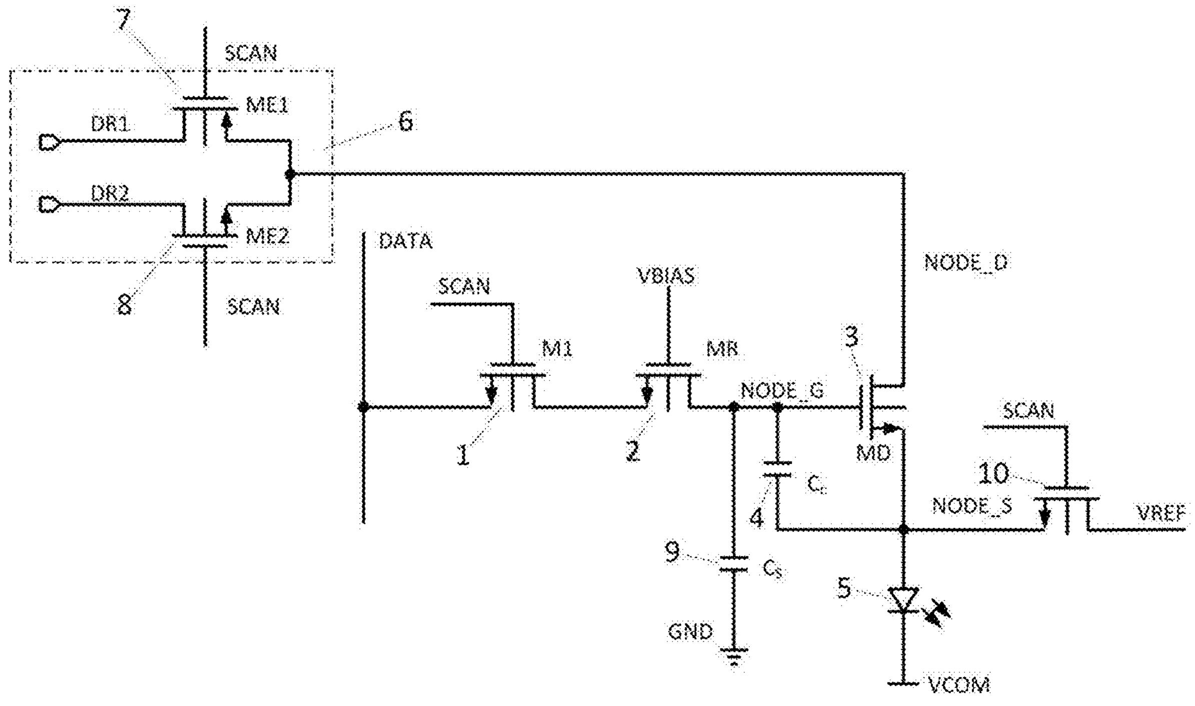
FIG. 7 is a schematic diagram of the circuit structure of a voltage-input pixel driving circuit in a fourth example of the present invention.

FIG. 7 shows a voltage-input pixel driving circuit for a microdisplay panel according to the present example. The voltage-input pixel driving circuit includes a first transistor M1 (1), a second transistor MR (2), a driving transistor MD (3), a coupling capacitor $C_C$ (4), a light-emitting element (5), and a MUX signal gating unit (6).

In the pixel driving circuit, the first transistor M1 (1) includes a gate connected to a scan signal line SCAN of the microdisplay panel, a source connected to a data signal line DATA of the microdisplay panel, and a drain connected to a source of the second transistor MR (2), a gate of the second transistor MR (2) is connected to an external bias voltage VBIAS, a drain of the second transistor MR (2) is connected to a gate of the driving transistor MD (3), a source of the driving transistor MD (3) is connected to one end of the light-emitting element (5), the other end of the light-emitting element (5) is connected to a common voltage VCOM, and a drain of the driving transistor MD (3) is connected to the MUX signal gating unit (6).

The MUX signal gating unit (6) includes a third transistor ME1 (7) and a fourth transistor ME2 (8), in which the third transistor ME1 (7) includes a gate connected to the scanning signal line of the microdisplay panel, a source connected to the drain of the driving transistor MD (3), and a drain connected to a first driving signal DR1; and the fourth transistor ME2 (8) includes a gate connected to the scanning signal line of the microdisplay panel, a source connected to the drain of the driving transistor MD (3), and a drain connected to a second driving signal DR2. As shown in FIG. 3, the MUX signal gating unit (6) in the present example is configured such that each row of pixels shares one MUX signal gating unit (6), thereby saving the area of the integrated circuit layout occupied by the MUX signal gating unit (6). Namely, the MUX signal gating unit (6) is located outside the pixel array, and each row of pixel units shares one MUX signal gating unit, and thus the area of the pixel unit circuit is not increased additionally.

In the present example, the first transistor M1 (1), the second transistor MR (2), the driving transistor MD (3), and the fourth transistor (8) are all NMOS transistors; and the third transistor ME1 (7) is a PMOS transistor.

In the present example, the external bias voltage VBIAS connected to the gate of the second transistor MR (2) satisfies $VBIAS>MAX\_V_{DATA}+V_{TH}$, where $MAX\_V_{DATA}$ is the maximum voltage value of a signal transmitted by the data signal line of the microdisplay panel, and $V_{TH}$ is the threshold voltage of the first transistor M1 (1). The threshold voltage is the turn-on voltage defined by the MOS transistor. Only when the gate-source voltage is greater than the threshold voltage, the MOS transistor has a significant current; when the gate-source voltage is less than the threshold voltage, the MOS transistor works in the subthreshold region or the turn-off region, and the current of the MOS transistor is very small at this time.

In the present example, the voltage value of the first driving signal DR1 is greater than the voltage value of the second driving signal DR2. In the present example, the first driving signal DR1 is set to be the external driving voltage VDDP, and the second driving signal DR2 is set to be grounded (GND).

In the present example, one end of the coupling capacitor $C_C$ (4) is connected to the gate of the driving transistor MD (3), and the other end thereof is connected to the source of the driving transistor MD (3). The coupling capacitor $C_C$ (4) is a capacitor of various types such as a MIM capacitor, a MOM capacitor, or a MOS capacitor.

In the present example, an adjustment capacitor $C_S$ (9) is provided at the gate of the driving transistor MD (3), one end of the adjustment capacitor $C_S$ (9) is connected to the gate of the driving transistor MD (3), and the other end thereof is connected to a fixed level. In the present example, the other end thereof is grounded.

In the present example, the pixel driving circuit further includes a third transistor M2 (10). The third transistor M2 (10) includes a source connected to the source of the driving transistor MD (3), a drain connected to an external reference voltage VREF, and a gate connected to the scan signal line SCAN of the microdisplay panel.

The working process of the voltage-input pixel driving circuit in the present example is as follows.

Data voltage writing phase: at this time, the signal of the scanning signal line SCAN is at a high level, the first transistor M1 (1) and the fourth transistor ME2 (8) are turned on, and the third transistor ME1 (7) is turned off because it is a PMOS transistor; since the external bias voltage VBIAS connected to the gate of the second transistor MR (2) satisfies VBIAS>MAX_$V_{DATA}$+$V_{TH}$, the second transistor MR (2) is also turned on; at this time, the gate voltage (NODE_G) of the driving transistor MD (3) is $V_{DATA}$, its source voltage (NODE_S) is initialized to the VREF level, and its drain (NODE_D) is grounded (GND) (the second driving signal DR2 is GND at this time), and thus static writing power consumption is not caused at this time. The external reference voltage VREF may vary depending on application requirements. For example, in the present example, the external reference voltage VREF may be connected to the ground terminal GND.

Light-emitting phase of display device: at this time, the signal of the scanning signal line SCAN is at a low level, the first transistor M1 (1) is turned off, the fourth transistor ME2 (8) is turned off, and the third transistor ME1 (7) is turned on; in this situation, the drain (NODE_D) of the driving transistor MD (3) is equivalent to being short-circuited with the first driving signal DR1 (the first driving signal DR1 is connected to the external driving voltage VDDP); at the initial stage, the gate voltage of the driving transistor MD (3) is $V_{DATA}$, the source voltage of the driving transistor MD (3) is the external reference voltage VREF, and thus the driving transistor MD (3) is turned on and the source of the driving transistor MD (3) is charged;

Assuming that the final source voltage of the driving transistor MD (3) is $V_{ANODE}$, and taking the capacitive coupling into consideration and assuming that the parasitic capacitance of the gate of the driving transistor MD (3) is $C_p$, the gate voltage is $V_{DATA}$+k×$V_{ANODE}$ (where $k=C_C/(C_C+C_p)$, k<1); at this time, if $V_{ANODE}$≈VDDP, then the gate voltage of the driving transistor MD (3) is k×VDDP+$V_{DATA}$. Since the gate voltage of the second transistor MR (2) is VBIAS>MAX_$V_{DATA}$+$V_{TH}$, the voltage difference between the gate of the second transistor MR (2) and the gate of the driving transistor MD (3) is less than k×VDDP−$V_{TH}$, namely, the voltage difference therebetween does not exceed VDDP.

In addition, the second transistor MR (2) isolates the first transistor M1 (1) and the gate of the driving transistor MD (3), thus preventing the leakage between the first transistor M1 (1) and the driving transistor MD (3), and reducing the coupling effect on the gate of the driving transistor MD (3) when the signal of the scanning signal line SCAN of the display panel jumps from a high level to a low level.

Example 5

Figure 8:
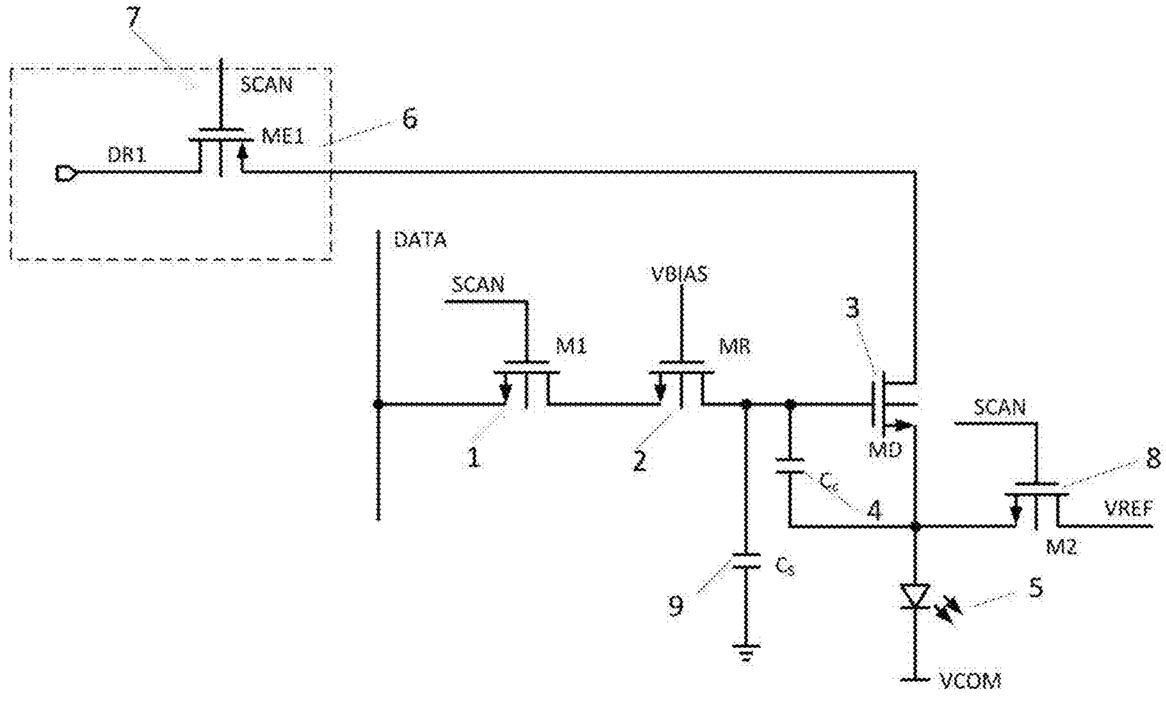
FIG. 8 is a schematic diagram of the circuit structure of a voltage-input pixel driving circuit in a fifth example of the present invention.

FIG. 8 shows a voltage-input pixel driving circuit for a microdisplay panel according to the present example. The voltage-input pixel driving circuit includes a first transistor M1 (1), a second transistor MR (2), a driving transistor MD (3), a coupling capacitor $C_C$ (4), a light-emitting element (5), a MUX signal gating unit (6), and an adjustment capacitor $C_S$ (9).

In the pixel driving circuit, the first transistor M1 (1) includes a gate connected to a scan signal line SCAN of the microdisplay panel, a source connected to a data signal line DATA of the microdisplay panel, and a drain connected to a source of the second transistor MR (2), a gate of the second transistor MR (2) is connected to an external bias voltage VBIAS, a drain of the second transistor MR (2) is connected to a gate of the driving transistor MD (3), a source of the driving transistor MD (3) is connected to one end of the light-emitting element (5), the other end of the light-emitting element (5) is connected to a common voltage VCOM, and a drain of the driving transistor MD (3) is connected to the MUX signal gating unit (6).

The MUX signal gating unit (6) includes a third transistor ME1 (7), in which the third transistor ME1 (7) includes a gate connected to the scanning signal line of the microdisplay panel, a source connected to the drain of the driving transistor MD (3), and a drain connected to a first driving signal DR1. As shown in FIG. 3, the MUX signal gating unit (6) in the present example is configured such that each row of pixels shares one MUX signal gating unit (6), thereby saving the area of the integrated circuit layout occupied by the MUX signal gating unit (6). Namely, the MUX signal gating unit (6) is located outside the pixel array, and each row of pixel units shares one MUX signal gating unit, and thus the area of the pixel unit circuit is not increased additionally.

In the present example, the first transistor M1 (1), the second transistor MR (2), and the driving transistor MD (3) are all NMOS transistors; and the third transistor ME1 (7) is a PMOS transistor.

In the present example, the external bias voltage VBIAS connected to the gate of the second transistor MR (2) satisfies VBIAS>MAX_$V_{DATA}$+$V_{TH}$, where MAX_$V_{DATA}$ is the maximum voltage value of a signal transmitted by the data signal line of the microdisplay panel, and $V_{TH}$ is the threshold voltage of the first transistor M1 (1). The threshold voltage is the turn-on voltage defined by the MOS transistor. Only when the gate-source voltage is greater than the threshold voltage, the MOS transistor has a significant current; when the gate-source voltage is less than the threshold voltage, the MOS transistor works in the subthreshold region or the turn-off region, and the current of the MOS transistor is very small at this time.

In the present example, the first driving signal DR1 is set to be the external driving voltage VDDP.

In the present example, one end of the coupling capacitor $C_C$ (4) is connected to the gate of the driving transistor MD (3), and the other end thereof is connected to the source of the driving transistor MD (3). The coupling capacitor $C_C$ (4) is a capacitor of various types such as a MIM capacitor, a MOM capacitor, or a MOS capacitor.

In the present example, an adjustment capacitor $C_S$ (9) is provided at the gate of the driving transistor MD (3), one end of the adjustment capacitor $C_S$ (9) is connected to the gate of the driving transistor MD (3), and the other end thereof is connected to a fixed level. In the present example, the other end thereof is grounded In the present example, the pixel driving circuit further includes a third transistor M2 (8), in which the third transistor M2 (8) includes a source connected to the source of the driving transistor MD (3), a drain connected to an external reference voltage VREF, and a gate connected to the scanning signal line SCAN of the microdisplay panel. The external reference voltage VREF may vary depending on application requirements. For example, in the present example, the external reference voltage VREF may be connected to the ground terminal GND.

Example 6

Figure 9A:
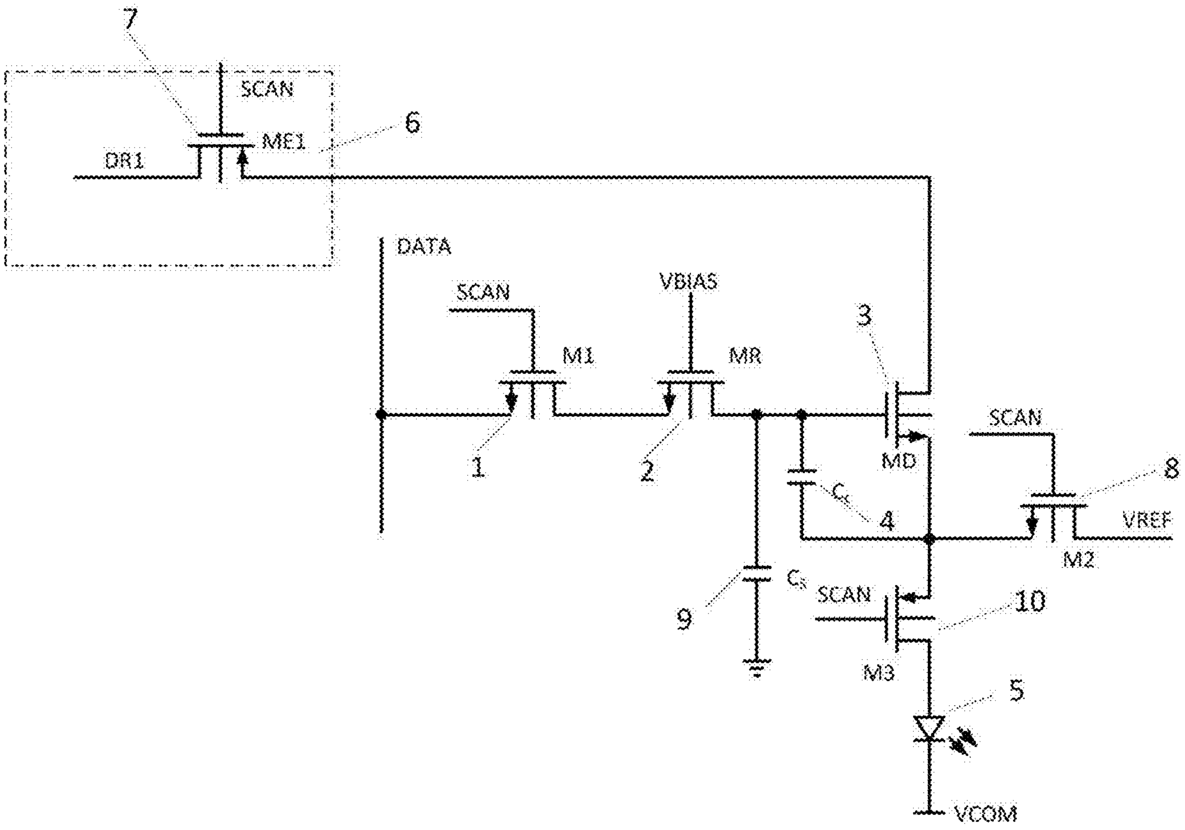
FIGS. 9A and 9B are schematic diagrams of the circuit structure of a voltage-input pixel driving circuit in a sixth example of the present invention.
Figure 9B:
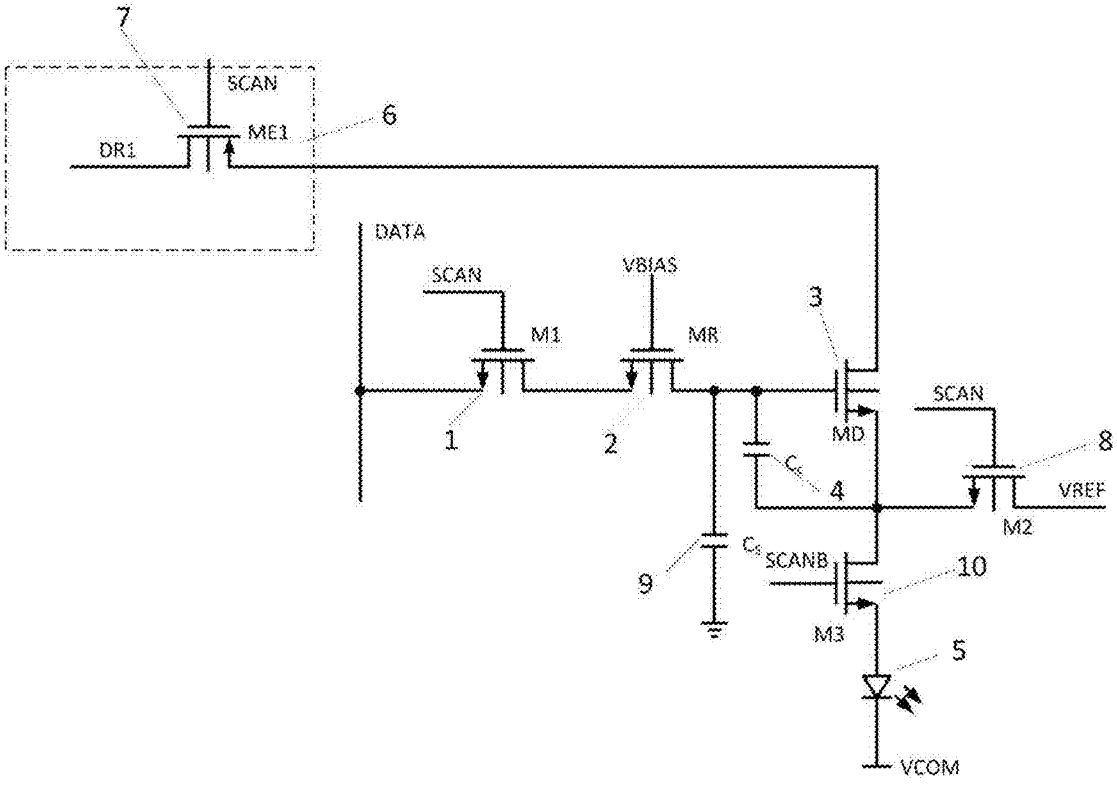

As shown in FIGS. 9A and 9B, in the present example, a third transistor M3 (10) is added based on the above-mentioned example 5.

As shown in FIG. 9A, when the third transistor M3 (10) is a PMOS transistor, the source of the driving transistor MD (3) is connected to the source of the third transistor M3 (10), the drain of the third transistor M3 (10) is connected to one end of the light-emitting element (5), and the other end of the light-emitting element (5) is connected to the common voltage VCOM. The gate of the third transistor M3 (10) is connected to a first scan signal line SCAN.

As shown in FIG. 9B, the drain of the third transistor M3 (10) is connected to the source of the driving transistor MD (3), the source of the third transistor M3 (10) is connected to one end of the light-emitting element (5), and the other end of the light-emitting element (5) is connected to the common voltage VCOM. The gate of the third transistor M3 (10) is connected to a second scan signal line SCANB.

The second scan signal line SCANB has a high or low level opposite to that of the first scan signal line SCAN. Namely, when the first scan signal line SCAN is at a high level, the second scan signal line SCANB is at a low level; and when the first scan signal line SCAN is at a low level, the second scan signal line SCANB is at a high level.

The above description is merely specific implementations of the present invention, and the protective scope of the present invention is not limited thereto. Any modification or replacement of the present invention made by a skilled person who is familiar with the present technology and pertaining to the technical specifications described in the present invention should fall within the protective scope of the present invention.

What is claimed is:

1. A voltage-input pixel driving circuit for a microdisplay panel, comprising: a first transistor M1, a second transistor MR, a driving transistor MD, a coupling capacitor $C_C$, a light-emitting element, and a MUX signal gating unit;

wherein the first transistor M1 comprises a gate connected to a scan signal line SCAN of the microdisplay panel, a source connected to a data signal line DATA of the microdisplay panel, and a drain connected to a source of the second transistor MR; a gate of the second transistor MR is connected to an external bias voltage VBIAS, a drain of the second transistor MR is connected to a gate of the driving transistor MD, a source of the driving transistor MD is connected to one end of the light-emitting element, the other end of the light-emitting element is connected to a common voltage VCOM, and a drain of the driving transistor MD is connected to the MUX signal gating unit;

the MUX signal gating unit outputs a low level signal when the scan signal line SCAN transmits a high level signal, and the MUX signal gating unit outputs a high level signal when the scan signal line SCAN transmits a low level signal; and the second transistor MR is in a normally-on state under an action of the external bias voltage VBIAS.

2. The voltage-input pixel driving circuit according to claim 1, wherein the MUX signal gating unit comprises a third transistor ME1 and a fourth transistor ME2, wherein the third transistor ME1 comprises a gate connected to the scan signal line SCAN of the microdisplay panel, a source connected to the drain of the driving transistor MD, and a drain connected to a first driving signal DR1; and the fourth transistor ME2 comprises a gate connected to the scan signal line SCAN of the microdisplay panel, a source connected to the drain of the driving transistor MD, and a drain connected to a second driving signal DR2.

3. The voltage-input pixel driving circuit according to claim 2, wherein the first transistor M1, the second transistor MR, the driving transistor MD, and the fourth transistor are all NMOS transistors; and the third transistor ME1 is a PMOS transistor.

4. The voltage-input pixel driving circuit according to claim 3, wherein a voltage value of the first driving signal DR1 is greater than a voltage value of the second driving signal DR2, the first driving signal DR1 is set to be an external driving voltage VDDP, and the second driving signal DR2 is set to be grounded, that is, to be GND.

5. The voltage-input pixel driving circuit according to claim 1, wherein the external bias voltage VBIAS connected to the gate of the second transistor MR satisfies $VBIAS>MAX\_V_{DATA}+V_{TH}$, where $MAX\_V_{DATA}$ is a maximum voltage value of a signal transmitted by the data signal line of the microdisplay panel, and $V_{TH}$ is a threshold voltage of the first transistor M1.

6. A display panel, wherein the display panel is a silicon-based LED panel or a silicon-based OLED panel, and the display panel uses the voltage-input pixel driving circuit according to claim 1 to drive pixels for display.

7. A voltage-input pixel driving circuit for a microdisplay panel, comprising: a first transistor M1, a second transistor MR, a driving transistor MD, a coupling capacitor $C_C$, a light-emitting element, a MUX signal gating unit, and an adjustment capacitor $C_S$;

wherein the first transistor M1 comprises a gate connected to a scan signal line SCAN of the microdisplay panel, a source connected to a data signal line DATA of the microdisplay panel, and a drain connected to a source of the second transistor MR, a gate of the second transistor MR is connected to an external bias voltage VBIAS, a drain of the second transistor MR is connected to a gate of the driving transistor MD, a source of the driving transistor MD is connected to one end of the light-emitting element, the other end of the light-emitting element is connected to a common voltage VCOM, and a drain of the driving transistor MD is connected to the MUX signal gating unit; and one end of the adjustment capacitor $C_S$ is connected to the gate of the driving transistor MD, and the other end thereof is connected to a fixed level;

the MUX signal gating unit outputs a low level signal when the scan signal line SCAN transmits a high level signal, and the MUX signal gating unit outputs a high level signal when the scan signal line SCAN transmits a low level signal; and the second transistor MR is in a normally-on state under an action of the external bias voltage VBIAS.

8. The voltage-input pixel driving circuit according to claim 7, wherein the MUX signal gating unit comprises a third transistor ME1 and a fourth transistor ME2, wherein the third transistor ME1 comprises a gate connected to the scan signal line SCAN of the microdisplay panel, a source connected to the drain of the driving transistor MD, and a drain connected to a first driving signal DR1; and the fourth transistor ME2 comprises a gate connected to the scan signal line SCAN of the microdisplay panel, a source connected to the drain of the driving transistor MD, and a drain connected to a second driving signal DR2.

9. The voltage-input pixel driving circuit according to claim 8, wherein the first transistor M1, the second transistor MR, the driving transistor MD, and the fourth transistor are all NMOS transistors; and the third transistor ME1 is a PMOS transistor.

10. The voltage-input pixel driving circuit according to claim 7, wherein the external bias voltage VBIAS connected to the gate of the second transistor MR satisfies $VBIAS > MAX\_V_{DATA} + V_{TH}$, where $MAX\_V_{DATA}$ is a maximum voltage value of a signal transmitted by the data signal line of the microdisplay panel, and $V_{TH}$ is a threshold voltage of the first transistor M1.

* * * * *